United States Patent
Soellinger et al.

(10) Patent No.: US 12,440,915 B2
(45) Date of Patent: Oct. 14, 2025

(54) ARC WELDING METHOD COMPRISING A CONSUMABLE WELDING WIRE

(71) Applicant: Fronius International GmbH, Pettenbach (AT)

(72) Inventors: Dominik Soellinger, Pettenbach (AT); Josef Artelsmair, Pettenbach (AT); Manuel Mayer, Pettenbach (AT)

(73) Assignee: Fronius Intellectual GmbH, Pettenbach (AT)

( * ) Notice: Subject to any disclaimer, the term of this patent is extended or adjusted under 35 U.S.C. 154(b) by 1092 days.

(21) Appl. No.: 17/051,973

(22) PCT Filed: Jul. 26, 2019

(86) PCT No.: PCT/EP2019/070143
§ 371 (c)(1),
(2) Date: Oct. 30, 2020

(87) PCT Pub. No.: WO2020/021050
PCT Pub. Date: Jan. 30, 2020

(65) Prior Publication Data
US 2021/0237191 A1    Aug. 5, 2021

(30) Foreign Application Priority Data

Jul. 27, 2018 (EP) .................................... 18186019

(51) Int. Cl.
*B23K 9/173* (2006.01)
*B23K 9/09* (2006.01)
*B23K 9/12* (2006.01)

(52) U.S. Cl.
CPC .............. *B23K 9/173* (2013.01); *B23K 9/092* (2013.01); *B23K 9/124* (2013.01)

(58) Field of Classification Search
CPC ............................... B23K 9/173; B23K 9/124
See application file for complete search history.

(56) References Cited

U.S. PATENT DOCUMENTS

| 4,994,646 A | 2/1991 | Tabata et al. |
| 6,051,807 A | 4/2000 | Ogasawara et al. |

(Continued)

FOREIGN PATENT DOCUMENTS

| CN | 102264500 A | 11/2011 |
| CN | 103974799 A | 8/2014 |

(Continued)

OTHER PUBLICATIONS

Indian Examination Report dated Mar. 31, 2021 in Indian Application No. 202017051055.

(Continued)

*Primary Examiner* — Ibrahime A Abraham
*Assistant Examiner* — Franklin Jefferson Wang
(74) *Attorney, Agent, or Firm* — Collard & Roe, P.C.

(57) ABSTRACT

The invention relates to an arc welding method using a consumable welding wire (1), wherein in successive welding cycles (SZ) during a welding process ($P_i$) a certain welding current (I(t)) is applied to the welding wire (1) and the welding wire is moved with a certain wire conveying speed (v(t)) towards a workpiece (2) to be processed. The aim of the invention is to further improve the stability of the welding method. The aim is achieved, according to the invention, in that in the event of a change of the welding process ($P_1$) to a welding process ($P_2$) with an increased mean wire conveying speed ($v_{mean}$) during a welding cycle (SZ) and/or with an increased mean welding current ($I_{mean}$) during a welding cycle (SZ), a lowering phase (AP) is initiated, wherein in the lowering phase (AP) the welding current ($I_A(t)$) is lowered for a specified duration ($\Delta t_A$).

13 Claims, 4 Drawing Sheets

(56) References Cited

U.S. PATENT DOCUMENTS

| | | | |
|---|---|---|---|
| 8,723,080 B2 | 5/2014 | Kawamoto et al. | |
| 10,537,955 B2 | 1/2020 | Fujiwara et al. | |
| 2007/0102409 A1* | 5/2007 | Koshiishi | B23K 9/092 |
| | | | 219/130.51 |
| 2012/0097654 A1 | 4/2012 | Kawamoto et al. | |
| 2015/0083702 A1* | 3/2015 | Scott | B23K 9/095 |
| | | | 219/148 |
| 2015/0283639 A1* | 10/2015 | Henry | B23K 9/173 |
| | | | 219/130.51 |
| 2015/0375331 A1* | 12/2015 | Hutchison | B23K 9/09 |
| | | | 219/136 |
| 2017/0355034 A1* | 12/2017 | Matsuoka | B23K 9/073 |
| 2018/0207739 A1* | 7/2018 | Kawamoto | B23K 9/09 |
| 2020/0316703 A1* | 10/2020 | Matsuoka | B23K 9/09 |

FOREIGN PATENT DOCUMENTS

| | | | |
|---|---|---|---|
| CN | 105750695 A | 7/2016 | |
| DE | 37 31 180 A1 | 3/1989 | |
| DE | 689 20 774 T2 | 7/1995 | |
| JP | 3018807 B2 | 3/2000 | |
| JP | 2005313179 A | 11/2005 | |
| JP | 2016128187 A * | 7/2016 | ........... B23K 9/0671 |

OTHER PUBLICATIONS

International Search Report in PCT/EP2019/070143, mailed Nov. 19, 2019.

European Search Report in EP 18186019.8-1016, dated Mar. 14, 2019, with English translation of relevant parts.

Notification of Transmittal of Copies of Translation of the International Preliminary Report on Patentability in PCT/EP2019/070143, mailed Jan. 28, 2021, with English translation of the International Preliminary Report on Patentability dated Jul. 29, 2020.

* cited by examiner

ARC WELDING METHOD COMPRISING A CONSUMABLE WELDING WIRE

CROSS REFERENCE TO RELATED APPLICATIONS

This application is the National Stage of PCT/EP2019/070143 filed on Jul. 26, 2019, which claims priority under 35 U.S.C. § 119 of European Application No. 18186019.8 filed on Jul. 27, 2018, the disclosure of which is incorporated by reference. The international application under PCT article 21 (2) was not published in English.

The invention relates to an arc welding method using a consumable welding wire, wherein in successive welding cycles during a welding process a certain welding current is applied to the welding wire and the welding wire is moved toward a workpiece to be processed at a certain wire conveying speed.

In arc welding methods using a consumable welding wire, such as MIG (metal inert gas) welding or MAG (metal active gas) welding, the consumable welding wire is contacted in the contact tube of the welding torch and has a welding voltage and a welding current applied to it, so that an electric arc is formed from the free end of the welding wire to the workpiece, which melts the end of the welding wire, leading to a material transfer from the welding wire to the workpiece. The so-called stickout, or the free length of the wire electrode, is the length of the welding wire from the end of the contact tube to the end of the welding wire where the arc is ignited. During welding, welding cycles are repeated at a specific welding frequency and during each welding cycle the welding parameters, such as the speed of conveyance of the welding wire, the welding current, the welding voltage, and the speed of movement of the welding torch with respect to the workpiece etc., must be optimally matched to each other so that a stable arc can be achieved and, as a result, the quality of the welding seam is as consistent as possible. During each welding cycle, the welding parameters, such as the welding current or the wire conveying speed, have certain mean values, the mean welding current or the mean wire conveying speed.

For example, DE 37 31 180 A1 describes a welding method using consumable welding wire.

Document JP 2005 313179 A discloses an arc welding method in which different welding processes with different welding parameters are used to allow the heat input into the workpiece to be controlled.

In U.S. Pat. No. 6,051,807 A1 a pulsed welding method is disclosed, in which the welding current is controlled to cope with changes in the distance to the workpiece.

Due to the geometry of the workpiece to be processed, it is usually necessary to change the welding process several times during a welding operation and to adapt the welding parameters to the respective conditions. For example, a number of welding parameters need to be changed when transitioning to an overhead welding operation in which the weld seam is located above the welding torch.

When changing from the latest welding process just carried out over to a welding process which involves an increased mean wire conveying speed (i.e. the wire conveying speed averaged over a welding cycle) or an increased mean welding current (i.e. the welding averaged over a welding cycle), there is a risk of current overloading the free welding wire end or stickout. This can lead to instabilities and the formation of welding spatter and thus to a reduction in the weld quality.

In particular, a change in the welding process can result in an unwanted variation in the temperature in the stickout of the welding wire, and if a local thermal overload occurs at the free end of the welding wire an undesirable sudden melting of a longer portion of the free welding wire end and a sudden extension of the arc length can occur, which disrupts the welding process and reduces the weld quality.

The object of the present invention is to create an arc welding method as mentioned above, in which even if the welding process is changed to a welding process with an increased mean wire conveying speed during a welding cycle and/or an increased mean welding current during a welding cycle, the risk of thermal overload of the stickout is not present, or only to a lesser extent. The arc welding method should also remain stable under such a change in the welding process and should be associated with as constant a temperature distribution as possible in the free end of the welding wire and as constant an arc length as possible, and thus with as constant a weld quality as possible.

The object according to the invention is achieved by the fact that a lowering phase is initiated when the welding process is changed to a welding process with an increased mean wire conveying speed during a welding cycle and/or an increased mean welding current during a welding cycle, wherein the welding current is reduced for a specified duration in the lowering phase. By initiating such a lowering phase with a reduced welding current, the overloading of the stickout can be effectively counteracted when the welding process is changed to a welding process with an increased mean wire conveying speed and/or an increased mean welding current, and a stable arc with an essentially constant arc length can be achieved. The respective parameters during the lowering phase are selected and adjusted according to experience depending on the change in the welding parameters when the welding process is changed. In addition to the reduction in the welding current during the lowering phase, or else as an alternative, the wire conveying speed could also be increased during the lowering phase. After the specified period of the lowering phase has elapsed the welding process is continued with the welding parameters specified for this welding process.

Preferably, the lowering phase is only initiated after a specified delay time has elapsed. Maintaining a delay time allows account to be taken of the fact that the length component or the individual sub-segments of the free welding wire end, through which the increased welding current is passed, take a certain time to travel from the contact point on the contact tube, from which the welding current flows in the free end of the welding wire, to the end of the welding wire (melting point). This delay time and the temperature increase in the individual sub-segments of the stickout depends on the instantaneous wire conveying speed and a number of other welding parameters (waveform and amplitude of the welding current) and can be selected and adjusted depending on the change in the welding process, for example from corresponding tables or according to corresponding calculation rules. Of course, instead of a specified delay time an equivalent alternative is to use a specific path length over which the welding wire is moved forward after the change in the welding process, as a template.

According to another feature of the invention, the welding current in the lowering phase is reduced to a constant welding current value for the specified duration. This is the simplest case of the implementation of the lowering phase, in that, if applicable after a specified delay time has elapsed, the mean welding current is constantly reduced over a specified period of time, thus allowing any overheating of the free welding wire end to be counteracted in the event of a change in the welding process.

Alternatively, the welding current in the lowering phase can also be lowered during the specified period according to a specified function, for example in the form of a ramp. Specifying a particular characteristic for the welding current during the lowering phase means that thermal overload of the stickout can be even better counteracted and the most constant possible temperature distribution in the stickout, and therefore a stable welding process, can be achieved. The specified function of the welding current in the lowering phase can in principle have any desired characteristic, e.g. a ramp-shaped characteristic, but also a curved or similar characteristic.

The duration of the lowering phase, the welding current in the lowering phase and/or the specified delay time can be defined depending on the welding wire used. The parameters that characterize the lowering phase can be stored and saved, e.g. in tabular form depending on the welding wire material and the welding wire diameter, and selected automatically when the welding process is changed.

Preferably, the duration of the lowering phase is one to 30 welding cycles. Experience has shown that such a duration of the lowering phase results in a stable welding process.

The mean welding current in the lowering phase is reduced by preferably 10% to 50% compared to the preceding mean welding current during a welding cycle. Based on experience, a reduction in the mean welding current in the lowering phase by 10% to 50% is sufficient to effectively counteract a thermal overload of the stickout.

The specified delay time is ideally set such that the welding wire is moved in the direction of the workpiece by 5 mm to 25 mm during the delay time. The specified range of the movement of the welding wire corresponds to standard dimensions of the distance between the welding torch and the workpiece and the stickout, as well as the arc length. Depending on the welding wire conveying speed, the delay time is selected accordingly to achieve a corresponding forward movement of the welding wire during the delay time.

According to another feature, the free length of the welding wire is determined indirectly and the duration of the lowering phase, the mean welding current in the lowering phase, and/or the delay time are changed according to the free length of the welding wire determined. This measure allows the actual free length of the welding wire to be taken into account and thus even better protection is provided against overloading of the stickout.

The free welding wire length can be determined indirectly by measuring the welding voltage, the welding current between the welding wire and the workpiece, and the wire conveying speed. By recording the welding voltage, i.e. the voltage between the contact tube and the workpiece and the welding current, i.e. the current between the welding wire and the workpiece, as well as the wire conveying speed, the free welding wire length can be inferred and this can be taken into account when setting the parameters of the lowering phase according to the invention.

During a welding cycle, one pulsed-arc phase with at least one pulse-shaped welding current and one short-arc phase with one or more alternating short circuits between the welding wire and the workpiece, and arc phases can occur consecutively. In this case, the short circuits during the welding process can be used to measure the free welding wire length using a resistance measurement.

In the case of such a welding process, the free welding wire length in the short-arc phase can be determined during a short-circuit between the welding wire and the workpiece by means of a resistance measurement. To do so, during a short-circuit, i.e. during contact of the welding wire end with the workpiece, the voltage and current at the welding wire end are measured and the resistance is determined from this and the free welding wire length is then inferred from the resistance value. This measurement of the free welding wire length is of course only possible with short-circuit-based welding methods such as those described above.

If, in the event of a further change of the welding process to a welding process with an increased mean wire conveying speed during a welding cycle and/or an increased mean welding current during a welding cycle, the duration of the lowering phase compared to the specified duration is corrected, a further improvement can be achieved. The sudden melting of the wire end if the current drop is not adjusted correctly can be detected by measurement techniques by means of the equally abruptly rising voltage or the falling current, depending on the type of current/voltage control applied. From this the parameters can then be adjusted or corrected accordingly during the lowering phase in the event of subsequent changes to the welding process. This adjustment can be repeated until sudden melting of the wire end is no longer detected.

The present invention will be explained in further detail by reference to the attached drawings. In the figures.

Figure 1:
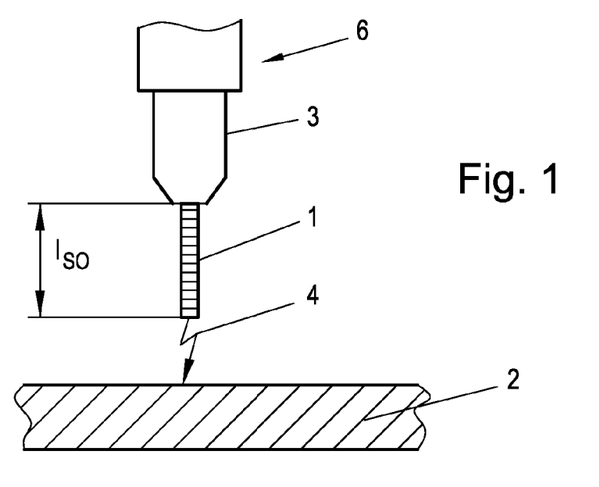
FIG. 1 shows a schematic drawing of a welding torch with a consumable welding wire.

FIG. 1 shows a schematic drawing of a welding torch 6 with a consumable welding wire 1. The consumable welding wire 1 is transported with a suitable conveying speed v(t) through a contact tube 3 of the welding torch 6 and contacted in the contact tube 3, so that the specified welding voltage U(t) and the specified welding current I(t) can be applied to the welding wire 1. If the welding parameters are appropriately matched, an arc 4 results between the end of the welding wire 1 and the workpiece 2, which should remain as constant as possible during the welding process. The free welding wire length or the so-called stickout is the length $l_{so}$ of the welding wire 1 from the end of the contact tube 3 to the beginning of the arc 4. The length $l_{so}$ of the stickout should remain as constant as possible in a stable welding process. The welding current I flows from the contact point on the contact tube 3 through the welding wire 1 and contributes to its heating. The schematically drawn sub-segments of the welding wire 1 require a certain time to travel from the contact point on the contact tube 3 to the end of the welding wire 1. In a stable welding process, only a small sub-segment or a small length section of the welding wire 1 is melted and this molten part of the welding wire 1 passes into the melting bath.

If the welding process $P_i$ is changed to a welding process $P_{i+1}$, which is accompanied by an increased mean wire conveying speed $v_{mean}$ during a welding cycle SZ and/or an increased mean welding current $I_{mean}$ during a welding cycle SZ, there is a risk that parts of the free welding wire end become overheated, resulting in a sudden melting of multiple sub-segments or a longer portion of the welding wire 1, which also abruptly increases the length of the arc 4 and thus disrupts the welding process $P_i$ and may even lead to the formation of welding spatter. Such instabilities during the welding lead to a reduction of the weld quality. Each sub-segment of the stickout with length $l_{so}$ is heated differently with an increased mean welding current $I_{mean}$ from the time the change in the welding process $P_i$ occurs, since the wire conveying speed v can only increase gradually in the form of a ramp but the welding current I must be increased abruptly, as the droplet release cannot otherwise take place. This momentary imbalance between wire conveying speed v and welding current I causes the temperature increase in that region (sub-segments) of the free wire length through which the increased welding current I passes the longest. These are the sub-segments that are located at the point of contact or current transition point in the contact tube 3 at the time of the increase in the welding current I and/or the wire conveyance v. If the welding current I is not changed, some of these segments of the welding wire 1 will melt abruptly when they arrive at the front part of the free wire end, i.e. when they are positioned in the immediate vicinity of the onset of the arc 4. The longer the length $l_{so}$ of the free wire end, the longer the increased welding current I flows through the sub-segments and the longer their temperature increases, so that above a certain free wire end (stickout), this sudden melting of a longer part of the wire end can occur if no countermeasures are implemented.

Figure 2:
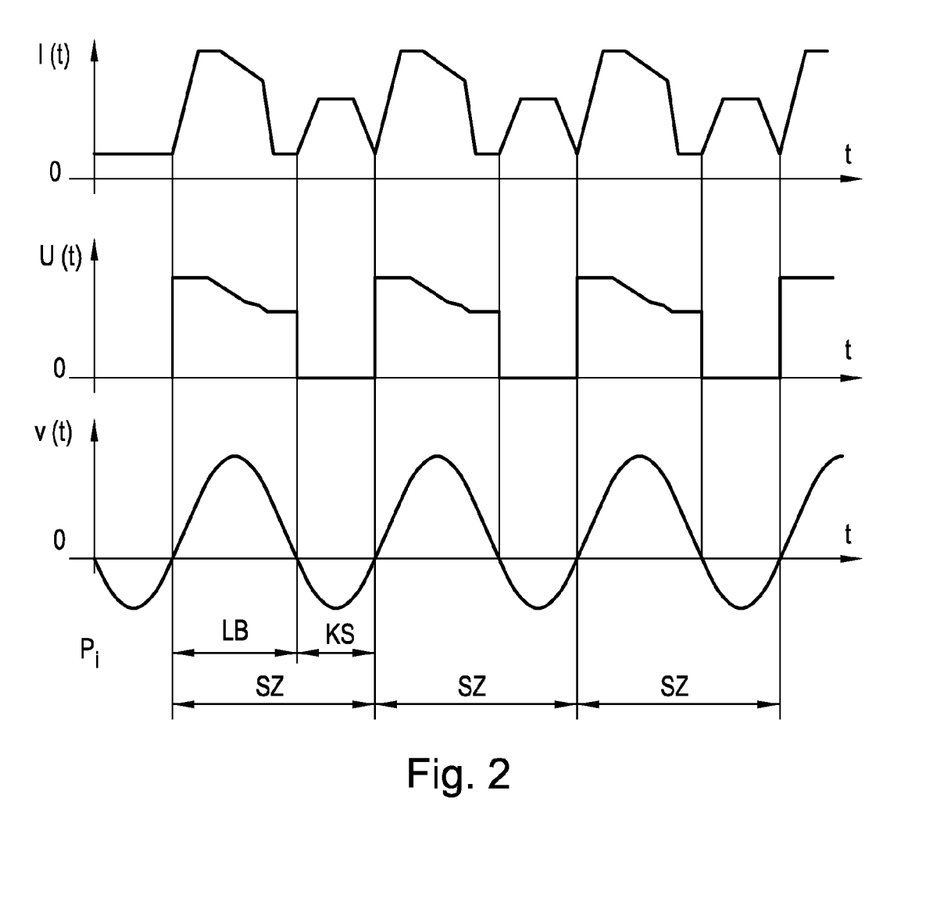
FIG. 2 shows time waveforms of the welding current I(t), the welding voltage U(t) and the welding wire speed v(t) for a short-circuit-based welding process.

FIG. 2 shows the temporal waveforms of the welding current I(t), the welding voltage U(t) and the welding wire speed v(t) in a short-circuit-based welding process $P_i$. The welding process consists of welding cycles SZ which are repeated with the welding frequency and in which the welding parameters follow a specific time profile. In the example profile of the welding current I(t) shown, a current pulse is applied during the arc phase LB and during the short-circuit phase KS a further current pulse is applied with a lower amplitude than during the arc phase LB. The welding voltage U(t) has a profile that is essentially constant during the arc phase LB and breaks down as expected during the short-circuit phase KS. During the arc phase LB, the wire conveying speed v(t) has an essentially positive course, i.e. a movement in the forward direction and during the short-circuit phase a reverse movement, i.e. away from the workpiece 2. On average, a certain mean wire conveying speed $v_{mean}$ in the direction of the workpiece 2 occurs during a welding cycle SZ, because during the welding process $P_i$ the welding wire 1 melts and material is transferred to the workpiece 2. Of course, the welding process $P_i$ can also include a wire conveying speed in the direction of the workpiece only, without reverse movement.

Figure 3:
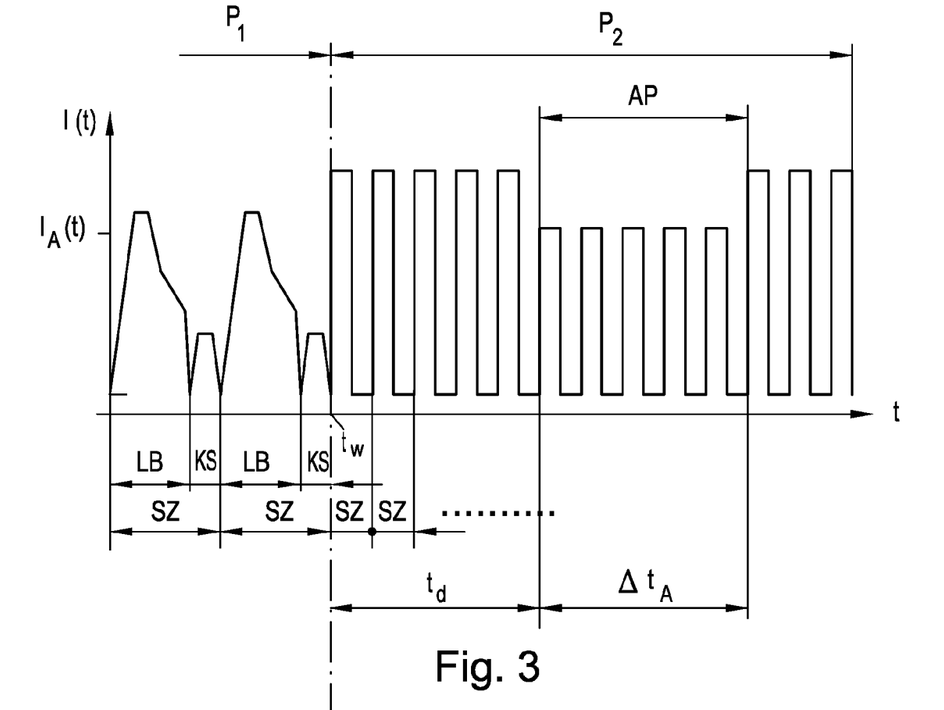
FIG. 3 shows the temporal waveform of the welding current I(t) in the event of a change in the welding process in a design variant of the lowering phase according to the invention.

FIG. 3 shows the temporal waveform of the welding current I(t) when a change occurs from a welding process $P_i$ to a welding process $P_2$ for a design variant of the lowering phase AP according to the invention. For example, the welding process $P_i$ is a short-circuit-based welding process, while the welding process $P_2$ is a pulsed welding process. However, these could also be two pulsed processes of different power. At the time of the change from the welding process $P_i$ to the welding process $P_2$, a timer is started and after expiry of a specified delay time $t_d$ the lowering phase AP according to the invention is initiated. As mentioned above, instead of setting a delay time $t_d$, a certain path length can also be set over which the welding wire 1 is moved when the welding process is changed from $P_1$ to the welding process $P_2$. For the duration $\Delta t_A$ of the lowering phase AP, the mean welding current $I_{mean,A}$ during the lowering phase AP is reduced compared to the mean welding current during the second welding process $P_2$. In the example shown in FIG. 3, a lowering to a constant current value $I_{mean,A}$ takes place. After the end of the duration $\Delta t_A$ of the lowering phase AP, the welding process $P_2$ is continued with the welding parameters that were valid before the lowering phase AP or with the welding parameters specified for the welding process $P_2$.

Figure 4:
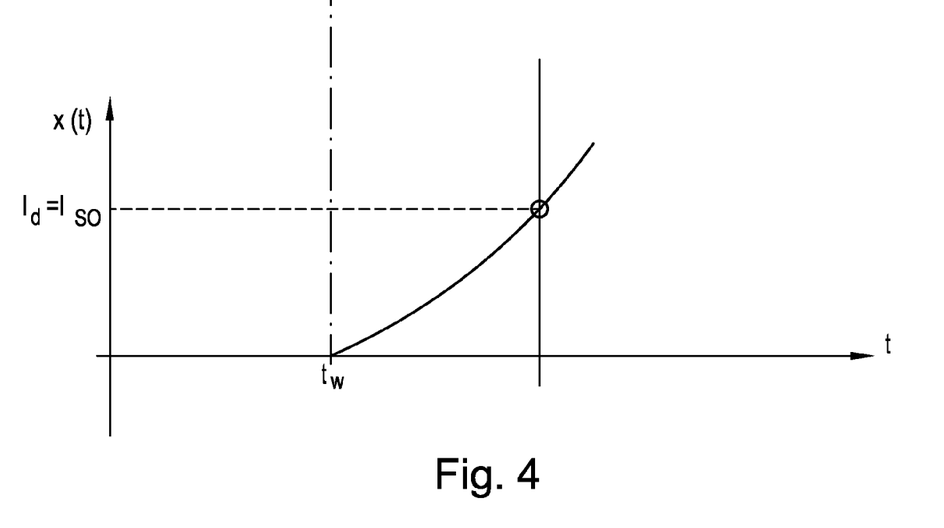
FIG. 4 shows the waveform of the welding wire corresponding to the current waveform according to FIG. 3 from the time of the process change.

FIG. 4 shows the waveform of the welding wire 1 corresponding to the current waveform according to FIG. 3 from the time of the process change. The distance travelled by the free welding wire end x(t) as a function of time t extends up to the stickout length $l_{so}$, whereupon the lowering phase AP is initiated. The delay time $t_d$ until the initiation of the lowering phase AP is thus set or selected such that, from the start (time $t_w$) of the change from the welding process $P_1$ to the welding process $P_2$, the welding wire 1 executes an conveyance corresponding to the desired stickout length $l_{so}$ during this time. The length $l_d$ which the welding wire 1 is moved forward during the delay time $t_d$ in this case is equal to the stickout length $l_{so}$. The lowering phase AP is then initiated, thus effectively preventing an overheating of the free welding wire end. However, the delay time $t_d$ can also be chosen to be shorter or longer than the time required by the welding wire 1 to reach the stickout length $l_{so}$ (see example according to FIGS. 5 and 6).

Figure 5:
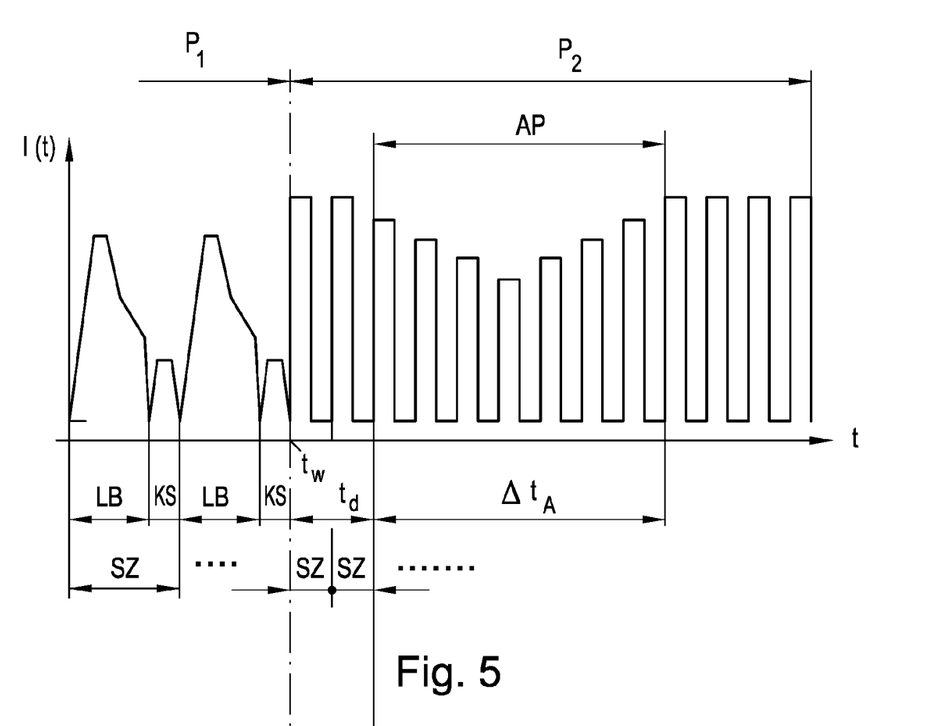
FIG. 5 shows the temporal waveform of the welding current I(t) in the event of a change in the welding process in a second design variant of the lowering phase according to the invention.

FIG. 5 shows the temporal waveform of the welding current I(t) when a change occurs from the welding process $P_i$ to a welding process $P_2$ (time $t_w$) in a second design variant of the lowering phase AP according to the invention. In contrast to the variant according to FIGS. 3 and 4, here the mean welding current during the lowering phase AP is reduced in the form of a predefined function, here in the shape of a ramp, and increased again. In this way, a further improvement in the consistency of the temperature in the free welding wire end can be achieved under certain conditions, and thus a more stable welding process can also be achieved when changing from a welding process $P_i$ to a different welding process $P_2$ with an increased mean wire conveying speed v(t) during a welding cycle SZ and/or an increased mean welding current $I_{mean}$ (t) during a welding cycle SZ.

Figure 6:
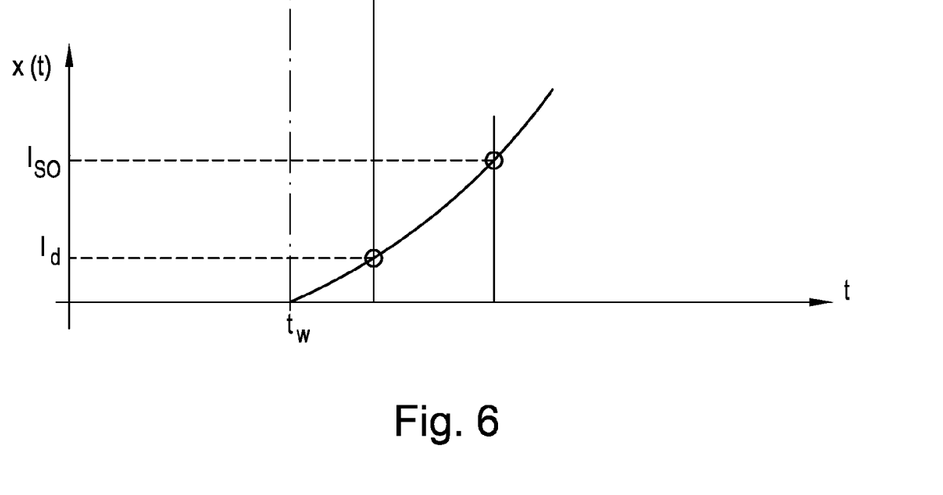
FIG. 6 shows the waveform of the welding wire corresponding to the current waveform according to FIG. 5 from the time of the process change.

FIG. 6 shows the waveform of the welding wire 1 corresponding to the current waveform according to FIG. 5 from the time of the process change at time tw. Here, the delay time $t_d$ until the initiation of the lowering phase AP is chosen shorter than in the exemplary embodiment according to FIG. 4. From the time when the welding process $P_i$ changes to the welding process $P_2$, the welding wire 1 has moved forward during this delay time $t_d$ a length $l_d$ which is shorter than the stickout length $l_{so}$.

Figure 7:
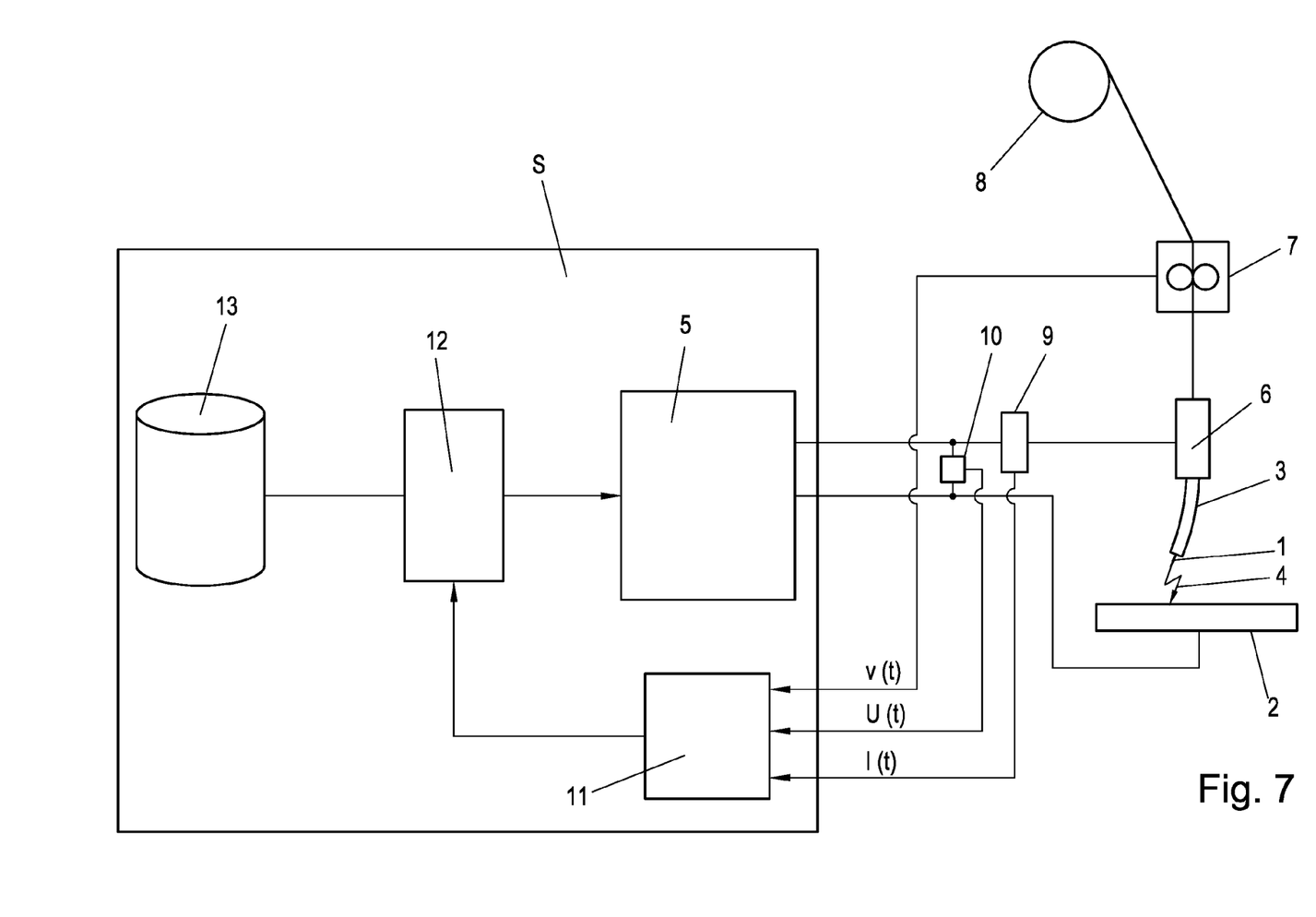
FIG. 7 shows a block diagram of a device for implementing the method according to the invention.

Finally, FIG. 7 shows the block diagram of a device for carrying out the method according to the invention. The welding torch 6 with the contact tube 3 and welding wire 1 is connected to the welding current source 5 and to a wire conveying device 7, which moves the welding wire 1 from a wire reel 8 with a corresponding speed v(t) through the contact tube 3 of the welding torch 6. The workpiece 2 to be processed is connected to the welding current source 5, as a result of which an arc 4 is formed when a corresponding welding current I(t) and a corresponding welding voltage U(t) are applied to the welding wire 1 via the contact tube 3. A control device 12 controls the plurality of welding parameters during the welding method.

According to the invention, specific parameters of the welding method are recorded in a processing device 11 and processed accordingly. These parameters include the wire conveying speed v(t), which is supplied from the wire conveying device 7 to the processing device 11, the welding current I(t), which is determined by a corresponding device 9 for measuring the welding current I(t) and fed to the processing device 11, and the welding voltage U(t), which is determined with an appropriate device 10 for measuring the welding voltage U(t).

When a welding process $P_i$ is changed, these parameters are then processed accordingly in the processing device 11 and used to control the control device 12. For example, the settings for the lowering phase AP according to the invention are selected from a database 13 according to the welding parameters set by the welding current source and the measured parameters. By introducing the lowering phase AP with the delay time $t_d$, duration $\Delta t_A$ and the lowered mean welding current $I_{mean,A}$ during the lowering phase AP, it is possible to effectively counteract overheating of the stickout when the welding process $P_i$ is changed, so that a stable welding process and an optimum weld quality can be achieved.

The invention claimed is:

1. An arc welding method using a consumable welding wire, wherein in successive welding cycles during a welding process a certain welding current is applied to the welding wire and the welding wire is moved with a certain wire conveying speed towards a workpiece to be processed,
   wherein when the welding process is changed to another welding process with an increased mean wire conveying speed during a welding cycle, wherein the mean wire conveying speed is the wire conveying speed averaged over the welding cycle, and/or with an increased mean welding current during a welding cycle, wherein the mean welding current is the welding current averaged over the welding cycle, a lowering phase is initiated during the another welding process, wherein in the lowering phase the welding current is lowered for a specified duration, by the mean welding current in the lowering phase being reduced by 10% to 50% compared to the previous mean welding current during a welding cycle, wherein the lowering phase is performed only once and not repeated during the another welding process after the welding process is changed, and wherein after the specified duration of the lowering phase, the another welding process continues with the increased mean wire conveying speed during the welding cycle and/or with the increased mean welding current during the welding cycle, and
   wherein the welding process is a short-circuited welding process and the another welding process is a pulsed welding process.

2. The arc welding method according to claim 1, wherein the lowering phase is initiated after a specified delay time has elapsed.

3. The arc welding method according to claim 1, wherein the welding current in the lowering phase is reduced to a constant welding current value for the specified duration.

4. The arc welding method according to claim 1, wherein the welding current in the lowering phase is reduced according to a specified function for the specified duration.

5. The arc welding method according to claim 2, wherein the duration of the lowering phase, the welding current in the lowering phase and/or the specified delay time are specified depending on the welding wire used.

6. The arc welding method according to claim 2, wherein the specified delay time is set such that the welding wire is moved towards the workpiece by 5 mm to 25 mm during the delay time.

7. The arc welding method according to claim 2, wherein the free length of the welding wire is determined and the duration of the lowering phase, the mean welding current in the lowering phase and/or the delay time are modified depending on the determined free length of the welding wire.

8. The arc welding method according to claim 7, wherein the free welding wire length is determined indirectly by a measurement of the welding voltage, the welding current between the welding wire and the workpiece, and the wire conveying speed.

9. The arc welding method according to claim 7, wherein during a welding cycle, one pulsed-arc phase with at least one pulse-shaped welding current and one short-arc phase with one or more alternating short circuits between the welding wire and the workpiece and arc phases occur consecutively.

10. The arc welding method according to claim 9, wherein the free welding wire length in the short-arc phase is determined by means of a resistance measurement during a short-circuit between the welding wire and the workpiece.

11. The arc welding method according to claim 1, wherein in the event of a further change in the welding process to a welding process with an increased mean wire conveying speed during a welding cycle and/or an increased mean welding current during a welding cycle, the duration of the lowering phase is corrected with regard to the specified duration.

12. An arc welding method using a consumable welding wire, wherein in successive welding cycles during a welding process a certain welding current is applied to the welding wire and the welding wire is moved with a certain wire conveying speed towards a workpiece to be processed,
   wherein when the welding process is changed to another welding process with an increased mean wire conveying speed during a welding cycle, wherein the mean wire conveying speed is the wire conveying speed averaged over the welding cycle, and/or with an increased mean welding current during a welding cycle, wherein the mean welding current is the welding current averaged over the welding cycle, a lowering phase is initiated during the another welding process, wherein in the lowering phase the welding current is lowered for a specified duration, by the mean welding current in the lowering phase being reduced by 10% to 50% compared to the previous mean welding current during a welding cycle, wherein the lowering phase is performed only once and not repeated during the another welding process after the welding process is changed, and wherein after the specified duration of the lowering phase, the another welding process continues with the increased mean wire conveying speed during the welding cycle and/or with the increased mean welding current during the welding cycle,
   wherein the duration of the lowering phase is one to 30 welding cycles, and wherein the welding process is a short-circuited welding process and the another welding process is a pulsed welding process.

13. The arc welding method according to claim 2, wherein the duration of the lowering phase and/or the specified delay time are specified depending on the welding wire used.

\* \* \* \* \*

UNITED STATES PATENT AND TRADEMARK OFFICE
CERTIFICATE OF CORRECTION

| | | |
|---|---|---|
| PATENT NO. | : 12,440,915 B2 | Page 1 of 1 |
| APPLICATION NO. | : 17/051973 | |
| DATED | : October 14, 2025 | |
| INVENTOR(S) | : Dominik Soellinger et al. | |

It is certified that error appears in the above-identified patent and that said Letters Patent is hereby corrected as shown below:

On the Title Page

Item (73), please change: "Fronius Intellectual GmbH" to correctly read: -- Fronius International GmbH --

Signed and Sealed this
Eleventh Day of November, 2025

John A. Squires
*Director of the United States Patent and Trademark Office*